United States Patent
Kellicker et al.

(10) Patent No.: US 11,527,266 B2
(45) Date of Patent: Dec. 13, 2022

(54) ARTIFICIAL INTELLIGENCE ANALYSIS OF MULTIMEDIA CONTENT

(71) Applicant: WOWZA MEDIA SYSTEMS, LLC, Golden, CO (US)

(72) Inventors: Scott Kellicker, Worthington, OH (US); Barry Owen, Littleton, CO (US); James S. Sherry, Broomfield, CO (US); Ian Zenoni, Highlands Ranch, CO (US)

(73) Assignee: WOWZA MEDIA SYSTEMS, LLC, Golden, CO (US)

(*) Notice: Subject to any disclaimer, the term of this patent is extended or adjusted under 35 U.S.C. 154(b) by 0 days.

(21) Appl. No.: 16/840,177

(22) Filed: Apr. 3, 2020

(65) Prior Publication Data

US 2020/0321030 A1    Oct. 8, 2020

Related U.S. Application Data

(60) Provisional application No. 62/829,337, filed on Apr. 4, 2019.

(51) Int. Cl.

| | |
|---|---|
| *G11B 27/036* | (2006.01) |
| *H04N 21/2187* | (2011.01) |
| *H04N 21/44* | (2011.01) |
| *H04N 21/845* | (2011.01) |
| *H04N 21/8352* | (2011.01) |
| *G11B 27/10* | (2006.01) |

(52) U.S. Cl.
CPC .......... *G11B 27/036* (2013.01); *G11B 27/10* (2013.01); *H04N 21/2187* (2013.01); *H04N 21/44008* (2013.01); *H04N 21/8352* (2013.01); *H04N 21/8456* (2013.01)

(58) Field of Classification Search
CPC .. G11B 27/036; G11B 27/10; H04N 21/2187; H04N 21/44008; H04N 21/8352; H04N 21/8456
USPC ........................................................ 386/248
See application file for complete search history.

(56) References Cited

U.S. PATENT DOCUMENTS

| | | | |
|---|---|---|---|
| 2004/0045030 A1* | 3/2004 | Reynolds | H04L 65/604 725/110 |
| 2008/0138030 A1* | 6/2008 | Bryan | H04N 21/4221 386/343 |
| 2014/0025837 A1* | 1/2014 | Swenson | H04N 21/23439 709/231 |
| 2018/0310045 A1* | 10/2018 | Panchaksharaiah | H04N 21/47217 |
| 2019/0132422 A1* | 5/2019 | Garcia Duran | H04L 41/16 |

* cited by examiner

*Primary Examiner* — Daniel T Tekle
(74) *Attorney, Agent, or Firm* — Porzio Bromberg Newman P.C.

(57) ABSTRACT

A method includes receiving video segments from a transcoder of a media device. The video segments are associated with multimedia content. The method further includes detecting, during a delay associated with the multimedia content and using an artificial intelligence (AI) technique, a particular representation in at least one of the video segments. The method further includes generating metadata associated with the particular representation and sending the metadata to a multimedia player to enable the multimedia player to modify playback of the multimedia content based on the metadata.

10 Claims, 3 Drawing Sheets

ARTIFICIAL INTELLIGENCE ANALYSIS OF MULTIMEDIA CONTENT

CROSS REFERENCE TO RELATED APPLICATIONS

The present application claims priority to U.S. Provisional Patent Application No. 62/829,337 filed Apr. 4, 2019 which is herewith incorporated by reference into the present application.

BACKGROUND

The popularity of the Internet, coupled with the ever-increasing capabilities of personal/mobile electronic devices, has provided users with the ability to enjoy, as well as to generate for others to enjoy, multimedia content almost anytime and anywhere. For example, users may receive streams corresponding to live and video on demand (VOD) content (e.g., television shows and movies) at personal electronic devices, such as computers, mobile phones, and tablet computers. Further, users may use a personal electronic device to capture and stream live events (e.g., sports events) to other users.

In some cases, multimedia content is modified prior to playback at a media device. For example, multimedia editing programs can be used to modify multimedia content. Multimedia editing can be time consuming and computationally intensive. For example, multimedia editing can add latency to operation of a player device being used to view the multimedia content, which may reduce quality of user experience.

SUMMARY

In accordance with aspects of the disclosure, metadata is determined for multimedia content using content analysis techniques and in parallel with other processing of the multimedia content, with transport of the multimedia content, or both. The content analysis techniques may, in some examples, include artificial intelligence (AI)-based audio and/or video processing, as further described herein. Examples of such processing may include, but are not limited to, object detection, object tracking, facial detection, facial recognition, text recognition, text extraction, text-to-speech, speech-to-text, vehicle recognition, animal detection, person detection, clustering, anomaly detection, scene change detection, etc. In an illustrative example, after transcoding of data to generate the multimedia content, video segments of the multimedia content (or data generated therefrom) may be analyzed by an AI analyzer to generate the metadata in parallel with transport of the multimedia content to a multimedia player. Thus, the metadata for particular analyzed segment(s) of the multimedia content may be provided to the multimedia player "out of band" with respect to the segment(s).

The multimedia player may maintain a buffer in which received segments of multimedia content are kept until they are retrieved for playback. The multimedia player may similarly maintain a buffer in which metadata received from the AI analyzer is kept. In the case of a live stream, the buffers may be fairly small. The metadata may include data, such as a content timestamp(s), segment identifier(s), etc., that enables the multimedia player to determine which specific segment(s) of content a particular piece of metadata was generated from. When metadata is available for particular segment(s), the multimedia player may generate "AI-adjusted" multimedia content for the segment(s). For example, in some implementations, the multimedia player may overlay certain depictions in the multimedia content based on the metadata, such one or more of an object, a face, a logo, or a person, where those depictions are based on the metadata for that segment. To illustrate, the metadata for segment(s) may identify an object that was detected in one or more frames of the segment(s) and may indicate time/position information for the object (e.g., at what specific times within the segment(s) the object was detected, and x/y pixel coordinates occupied by the object in the relevant video frames). The overlay may be based on the time/position information.

As yet another example, the multimedia player may truncate presentation of the multimedia content based on the video metadata (e.g., by terminating playback of the multimedia content in response to a determination that a person has left a field of view of a camera).

By performing AI analysis of multimedia content in parallel with other operations (e.g., processing and/or transport of the multimedia content), processing operations to generate the metadata can be "hidden" (e.g., as a background operation). For example, the AI analysis may be performed during a delay associated with processing by a transcoder, processing by a multimedia player, and/or transport of the multimedia content from the transcoder to the multimedia player. As a result, latency associated with performing AI analysis on multimedia content and using the results of such AI analysis to "enhance" the multimedia content is reduced (e.g., to a few seconds) as compared to other methodologies (e.g., which may take a few minutes or more). The techniques of the present disclosure thus enable AI analysis and use of the analysis results for live multimedia streams rather than just streams that re-broadcast previously recorded multimedia content.

DETAILED DESCRIPTION

Figure 1:
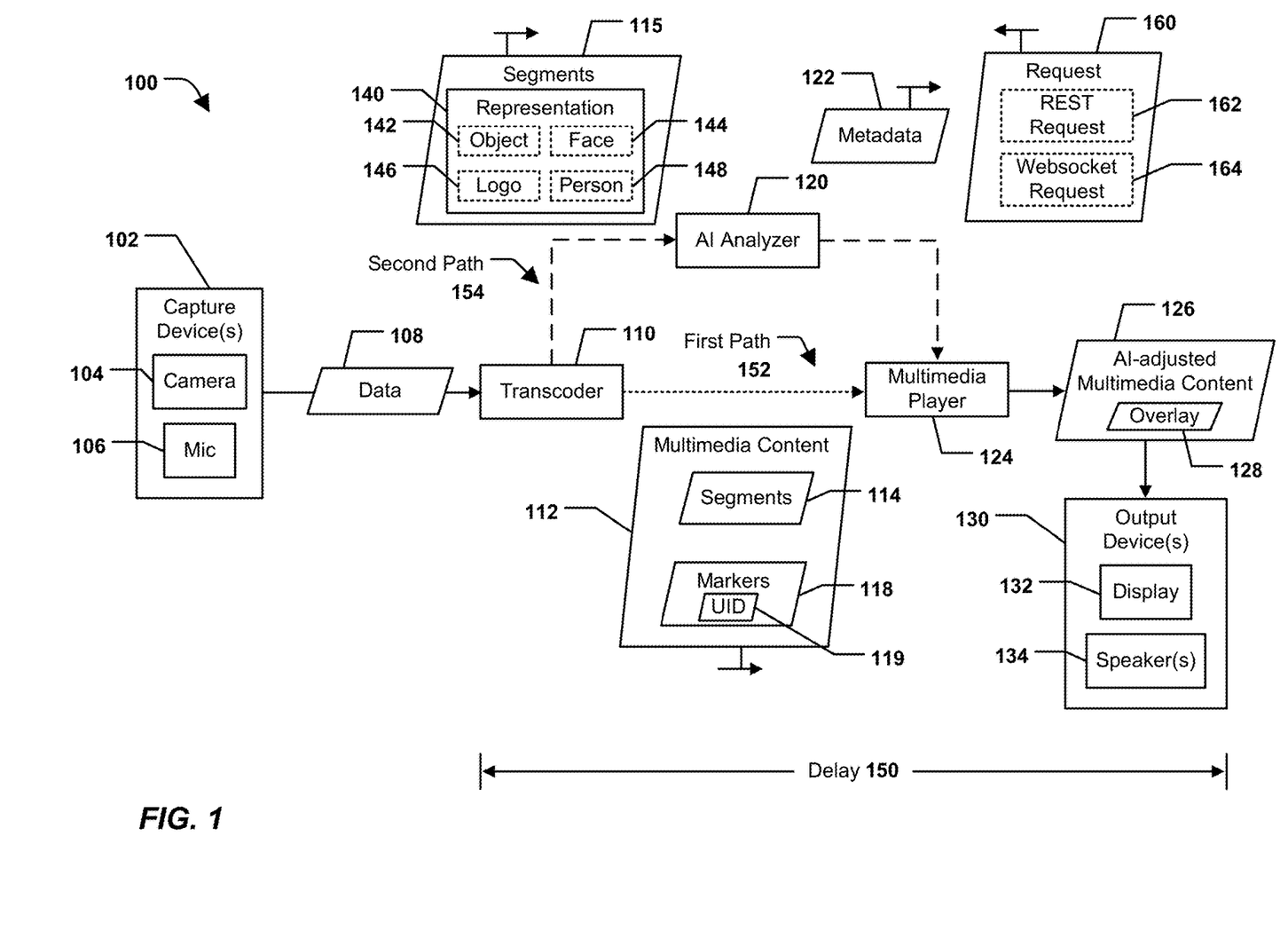
FIG. 1 illustrates a particular implementation of a system to perform AI analysis of multimedia content.

FIG. 1 illustrates a particular implementation of a system 100 to perform artificial intelligence (AI) analysis of multimedia content. Depending on the particular implementation, one or more aspects of the system 100 can be implemented at one or more media devices, one or more media servers, one or more other computing devices, or a combination thereof.

The system 100 includes capture device(s) 102. In a particular example, the capture device(s) 102 include one or more cameras (e.g., a camera 104) and one or more microphones, such as a microphone 106. In alternative examples, the capture device(s) 102 may output data captured by multiple video capture devices and/or multiple audio capture devices.

The system 100 further includes a transcoder 110. The transcoder 110 is coupled to the capture device(s) 102. In some implementations, the transcoder 110 is configured to perform adaptive bit rate transcoding in real-time (e.g., on-the-fly) or near-real-time. Operations of the transcoder 110 may be performed by dedicated hardware, by software instructions executed by a processor, or a combination thereof. In some examples, the transcoder 110 corresponds to a network-accessible cloud-based transcoding service.

The system 100 further includes an artificial intelligence (AI) analyzer 120 responsive to data received from the transcoder 110. Depending on the particular implementation, the AI analyzer 120 can include hardware components, instructions executable by a processor, or a combination thereof.

The system 100 further includes a multimedia player 124 responsive to the AI analyzer 120 and to the transcoder 110. The multimedia player 124 can include hardware components, instructions executable by a processor, or a combination thereof.

The system 100 further includes output device(s) 130. In the example illustrated, the output device(s) 130 include a display 132 and speaker(s) 134.

In the example of FIG. 1, the system 100 includes multiple parallel processing paths. For example, in some implementations, the system 100 includes a first path 152 (dotted line in FIG. 1) between the transcoder 110 and the multimedia player 124 and further includes a second path 154 (dashed lines in FIG. 1) from the transcoder 110 to the AI analyzer 120 and from the AI analyzer 120 to the multimedia player 124.

During operation, the capture device(s) are configured to generate data 108. The data 108 includes images (e.g., video) captured by the camera 104. The data 108 can also include samples of sounds detected by the microphone 106.

The transcoder 110 is configured to generate multimedia content 112 based on the data 108. For example, the transcoder 110 may transcode the data 108 to comply with a particular file format to generate the multimedia content 112. In some implementations, the transcoder 110 is configured to generate segments (or "chunks") 114. For example, each segment can include a particular duration of video and accompanying audio that is based on samples of sounds included in the data 108. As used herein, a "segment" includes video data, audio data, or both. A "video segment" includes at least video data, but not necessarily audio data, and an "audio segment" includes at least audio data, but not necessarily video data. It will be appreciated that when the transcoder 110 generates the multimedia content 112 on the basis of the data 108 as the capture device(s) 102 capture and transmit the data 108, the multimedia content 112 may correspond to a live stream.

The transcoder 110 may be configured to determine one or more "markers" associated with the multimedia content 112, such as a plurality of markers 118. For example, each marker of the plurality of markers 118 may identify a corresponding segment. In some examples, the multimedia content 112 includes the plurality of markers 118. For example, the plurality of markers 118 may be included in a file corresponding to the multimedia content 112. In other implementations, the plurality of markers 118 may be separate from the multimedia content 112 (e.g., where the plurality of markers 118 is included in another file that is separate from a file corresponding to the multimedia content 112). In some implementations, the plurality of markers 118 includes one or more unique identifiers (UIDs) associated with the segments 114, such as a segment UID 119 of a particular segment, a time range of the particular segment (e.g., 0:00:00.00 to 0:00:10.00) for a segment corresponding to the initial ten seconds of a live stream). In some implementations, the plurality of markers 118 have a particular format, such as an action message format (AMF).

In a particular example, the transcoder 110 is configured to provide segments 115 (which may or may not be identical to the segments 114) to the AI analyzer 120. In some implementations, the transcoder 110 is configured to selectively provide the segments 115, or portions thereof, or data generated from portions thereof, to the AI analyzer 120 (e.g., without other information included in the multimedia content 112) in order to reduce an amount of data transferred to the AI analyzer 120, to reduce processing overhead incurred by the AI analyzer 120, etc. In some examples, the AI analyzer 120 is configured to perform AI techniques on data, such as extracted features or feature vectors, that is derived from segments that are generated by the transcoder 110. In such examples, the features or feature vectors may be determined at the AI analyzer based on the received segments 115. Alternatively, the transcoder 110 may determine and provide such features or feature vectors to the AI analyzer 120 rather than providing the segments 115 themselves. As illustrative non-limiting examples, features or feature vectors may be generated by performing computer vision operations, including but not limited to image segmentation, color segmentation, image filtering, features from accelerated segment test (FAST), speeded up robust features (SURF), scale-invariant feature transform (SIFT), corner detection, edge detection, background subtraction, blob detection, other computer vision operations, etc.

In one example, the transcoder 110 is configured to provide the segments 115 to the AI analyzer 120 after completing transcoding of the data 108 to generate the multimedia content 112. In this example, the transcoder 110 may be configured to remove (e.g., "strip") other information from the multimedia content 112, such as audio data, the plurality of markers 118, or both. In another example, the transcoder 110 is configured to provide the segments 115 to the AI analyzer 120 "on the fly." In this example, one or more of the segments 115 can be provided to the AI analyzer 120 prior to completion of transcoding of the data 108 to generate the multimedia content 112.

In some examples, the quality of the segments 115 provided to the AI analyzer differs from the quality of the segments 114 being streamed to the multimedia player 124. To illustrate, in an adaptive bitrate (ABR) scenario, the transcoder may generate multiple different versions of the multimedia data 108. The various versions, called an ABR "renditions," may differ from each other with respect to one or more of: video bit rate, audio bit rate, video frame rate, video frame size (also known as resolution), video codec, audio codec, etc. The renditions may be keyframe-aligned, so switching between renditions at the multimedia player 124 can be performed relatively seamlessly. Depending on network conditions being experienced by the multimedia player 124, the multimedia player 124 may request that the next segment (or chunk) of the multimedia content 112 be from a particular rendition. Higher quality renditions may generally be requested in high bandwidth (or low congestion) scenarios and lower quality renditions may generally be requested in low bandwidth (or high congestion) scenarios. When the transcoder 110 generates multiple versions, e.g., renditions, of the multimedia content 112 in a live streaming scenario, the video segments sent to the AI analyzer 120 may be from a different rendition than the ones currently being communicated to the multimedia player 124, and may thus have a different bit rate, frame rate, frame size, etc.

In some implementations, the multimedia content 112 is associated with a delay 150. In some cases, the delay 150 represents the time period between when a particular segment of a live stream is generated by the transcoder 110 and when that segment is played by the multimedia player 124. For example, the delay 150 may correspond to or include a transport time associated with the multimedia content 112, such as a time associated with buffering and/or transmitting the multimedia content 112 from the transcoder 110 to the multimedia player 124. In such an example, the delay 150 may be influenced by computing resource availability at the multimedia player and network conditions between the multimedia player 124 and the transcoder 110 (and potentially intermediate network devices, such as edge nodes of a content delivery network (CDN)).

Alternatively, or in addition, the delay 150 may include time associated with transcoding of the data 108 by the transcoder 110 to generate the multimedia content 112. Alternatively, or in addition, the delay 150 may include time associated with receiving and/or processing the multimedia content 112 by the multimedia player 124.

The AI analyzer 120 is configured to detect, during the delay 150 associated with the multimedia content 112, a "representation" 140 in at least one of the segments 115. In a particular example, the AI analyzer 120 includes instructions of a program executed by a processor. In one example, the program corresponds to a machine learning program that uses an artificial neural network (ANN) to detect the representation 140 and to classify the representation 140. In other cases, different machine learning algorithms may be used, such as support vector machines (SVMs), autoencoders, regression models, naive Bayes models, perceptron models, decision trees, etc.

In the case of video data, the representation 140 may correspond to an object, a face, a logo, a person, text, etc. As a particular illustrative example, the AI analyzer 120 may be configured to detect presence or absence of one or more of an object 142, a face 144, a logo 146, or a person 148. In the case of audio data, the representation 140 may correspond to detected speech, particular identified sounds, etc.

The AI analyzer 120 is configured to generate metadata 122 based on analysis of the segments 115. As used herein, "metadata" may be generated by the AI analyzer 120 based on video data in the segments 115, audio data in the segments 115, or both. "Video metadata" may be generated on the basis of at least video data, but not necessarily audio data. "Audio metadata" may be generated on the basis of at least audio data, but not necessarily video data.

In an illustrative aspect, the metadata 122 may specify one or more of the object 142, the face 144, the logo 146, or the person 148. In some implementations, the metadata 122 has a particular format, such as an ID3 metadata format. The metadata 122 can, in some examples, be JSON data that includes time and position information for the representation 140. To illustrate, the metadata 122 may indicate when (in terms of timestamp range) and where (in terms of pixel x/y coordinates per frame) a particular object was detected in the corresponding segment 115. So that the multimedia player 124 can determine what particular segment a particular piece of metadata 122 corresponds to, the metadata 122 and the segment may have a common identifier, e.g., a common UID 119.

In some cases, the delay 150 includes the time period associated with the processing performed by the AI analyzer 120. It will be appreciated that a goal of the system 100 may be to provide (via the second path 154) results of the AI analyzer 120 for particular segment(s) before the segment(s) is (received via the first path 152) and played by the multimedia player 124. When particular segment(s) and metadata for the segment(s) are received in advance of playback, the multimedia player 124 has time to act on the metadata and provide enhanced playback operation. When the stream is a live stream, excessive delay is not desirable. Further, there may be a government-imposed or suggested delay already in place. Advantageously, the system 100 may be configured to select the quality of video segments provided to the AI analyzer 120 so that the metadata 122 can be generated and provided to the multimedia player 124 within that already in place delay or with little addition to that delay (e.g., an addition of a few seconds rather than several minutes or more).

As an illustrative non-limiting example, for data 108 captured at t=0, the transcoder 110 may be able to generate the respective ABR renditions in two seconds, i.e., by t=2. It may take a segment (or data generated therefrom) one second to be provided from the transcoder 110 to the AI analyzer 120, regardless of quality, for example because in this scenario the transcoder 110 and AI analyzer 120 are connected by a local area network. Thus, the segment in question (or data generated therefrom) may arrive at the AI analyzer 120 at t=2+1=3. The AI analyzer may 120 may be able to generate metadata 122 for a segment of a high-quality rendition in five seconds (i.e., by t=3+5=8), of a medium-quality rendition in two seconds (i.e., by t=3+2=5), and of a low-quality rendition in one second (i.e., by t=3+1=4). It may take the metadata 122 two seconds to reach the multimedia player 124 (i.e., by t=8+2=10, t=5+2=7, or t=4+2=6). It may take a segment six seconds (i.e., by t=2+6=8) to reach the multimedia player 124 from the transcoder 110 via the first path 152, which may include multiple intermediate devices and networks. Because the multimedia content 112 is a live stream the multimedia player 124 may have a small segment buffer and there may be negligible or indeterminate delay between segment receipt and playback at the multimedia player 124.

In the above example, having the AI analyzer 120 process high quality video segments may not be advisable, because the resulting metadata 122 may not arrive at the multimedia player 124 via the second path 154 until t=10, which is two seconds after arrival via the first path 152 of the high quality segment itself, at t=8. Consequently, playback of the high quality segment may already have started at t=10. Even if playback has not already begun, there may not be enough time for the multimedia player 124 to use the metadata 122 in meaningful fashion, such as by overlaying a bounding box on a detected object during playback, overlaying image(s) or text during playback, overlaying content retrieved via a URL included in the metadata 122, etc. Thus, in this example, the transcoder 110 may elect to provide a low quality or medium quality segment to the AI analyzer 120 for analysis, even in cases where the multimedia player 124 receives the same content in a high quality segment because network conditions are favorable in terms of ABR rendition selection by the multimedia player 124. The transcoder 110 may make such an election based on the various timings described above, which may in some examples be measured by the various devices and then reported back to the transcoder 110.

In some examples, the transcoder 110 may select what quality segment to provide to the AI analyzer 120 so that the metadata 122 for a segment arrives at the multimedia player 124 before the segment itself, thereby taking into account processing time periods at the multimedia player 124. It will thus be appreciated that various factors within the system 100 may be balanced when determining what quality video segments should be analyzed at the AI analyzer 120.

In some situations, the AI analyzer 120 may process multiple video segments before generating metadata 122. In such situations, determining what data to provide the AI analyzer may involve considering at least the speed of the AI analyzer 120, the total length of video clip required by the AI analyzer 120, and the transport latency for the live stream.

The multimedia player 124 may be responsive to the multimedia content 112 and the metadata 122. In a particular example, the multimedia player 124 generates AI-adjusted multimedia content 126 based on the multimedia content 112 and the metadata 122. As an example, the multimedia player 124 may be configured to generate or supply an overlay 128 based on the metadata 122. In one example, in response to the metadata 122 indicating one or more of the object 142, the face 144, the logo 146, or the person 148 in the segments 114, the multimedia player 124 replaces (e.g., covers) the indicated item(s) with the overlay 128. Depending on the particular implementation, the overlay 128 may be generated by the multimedia player 124 during processing of the multimedia content 112, or the overlay 128 may be a "stock" shape or graphic included in a library of shapes or graphics accessible to the multimedia player 124. It will be appreciated that the metadata 122 may be useable regardless of what specific ABR rendition is being streamed to the multimedia player 124. In some cases, the specific overlay 128 used by the multimedia player 124 may be chosen based on the specific ABR rendition currently being streamed to the multimedia player 124.

Alternatively, or in addition, in some implementations, the multimedia player 124 is configured to terminate playback of the multimedia content 112 based on the metadata 122 (e.g., by truncating the multimedia content 112 to generate the AI-adjusted multimedia content 126). As an illustrative example, the metadata 122 may indicate particular times during which the person 148 is depicted in the segments 114. In some implementations, the multimedia player 124 is configured "trim" the multimedia content 112 to exclude one or more segments that do not depict the person 148. As a particular illustrative example, the multimedia player 124 may trim a portion of the multimedia content 112 prior to the person 148 entering a field of view of the camera 104, after the person 148 leaving the field of view of the camera 104, or both.

In some implementations, the metadata 122 is provided in accordance with a "pull" model rather than a "push" model. In a pull model, the multimedia player 124 may request the metadata 122 from the AI analyzer 120 (e.g., on an "as needed" basis). To illustrate, in response to receiving the markers 118, the multimedia player 124 may, if a user has authorized the multimedia player 124 to provide AI-enhanced playback, send a request 160 for the metadata 122 to the AI analyzer 120. The AI analyzer 120 may provide the metadata 122 to the multimedia player 124 based on the request 160. In pull model implementations, this request/response time may be considered when determining what quality segments should be analyzed by the AI analyzer 120. In some implementations, the request 160 can include or correspond to a representational state transfer (REST) request 162. Alternatively, or in addition, in some implementations, the request 160 can include or correspond to a websocket request 164.

In some implementations, the metadata 122 includes a URL that is determined based on the results of the AI analyzer 120. For example, the AI analyzer 120 may detect that frames of video in a segment 115 include a particular make and model of vehicle. The AI analyzer 120 may generate the metadata 122 to include a URL from which additional information about the vehicle can be retrieved. The multimedia player 124 may use the URL to retrieve content that is shown in the overlay 128, and the overlay 128 may be selectable by a user to perform additional operations (e.g., transform the playback of the multimedia content 112 into a smaller picture-in-picture window while a "main" window is devoted to displaying information about the vehicle).

In another example, the metadata 122 includes subtitle/caption text that is generated based on audible speech and/or sounds in the segments 115 provided to the AI analyzer 120. In another example, the metadata 122 includes subtitle/caption text generated based on text that is shown in frames of video in the segment 115. To illustrate, if the segment 115 shows a STOP sign, the subtitle/caption text may include the word "STOP," regardless of whether the word "STOP" was present in the audio data of the segment 115.

The output device(s) 130 are configured to receive segments of multimedia content 112. When metadata 122 is available and used to enhance a segment of the multimedia content 112, the output device(s) may receive a corresponding segment of AI-adjusted multimedia content 126. The segments of the content 112 and/or 126 may be presented to one or more users. For example, the display 132 may be configured to present video content of the AI-adjusted multimedia content 126. As another example, the speaker(s) may be configured to present audio content of the AI-adjusted multimedia content 126.

By performing AI analysis of the multimedia content 112 at least partially in parallel with other operations (e.g., processing and/or transport of the multimedia content 112), the operations to generate the metadata 122 can be "hidden" (e.g., as a background operation). For example, AI analysis by the AI analyzer 120 may be performed during the delay 150 (e.g., a delay associated with processing by the transcoder 110, processing by the multimedia player 124, processing by the AI analyzer 120, transport of the multimedia content 112 from the transcoder 110 to the multimedia player 124, etc.). As a result, latency associated with performing AI analysis on multimedia content and using the results of such AI analysis to "enhance" the multimedia content is reduced as compared to other methodologies. For pre-recorded multimedia content, there may not be time constraints on the AI analysis, and therefore such analysis can be performed and completed for an entire stream before streaming even begins, and the resulting metadata can be stored and delivered along with the stream itself. However, this luxury of time may not be available in a live streaming scenario, and therefore the video analysis methodologies used for pre-recorded content may be unsuitable for a live stream. It will be appreciated that the techniques of the present disclosure, which enable AI analysis and use of the analysis results with little to no added delay to a live stream (i.e., in real-time or near-real-time), are suitable for live streams and not just for streams that re-broadcast previously recorded multimedia content.

Figure 2:
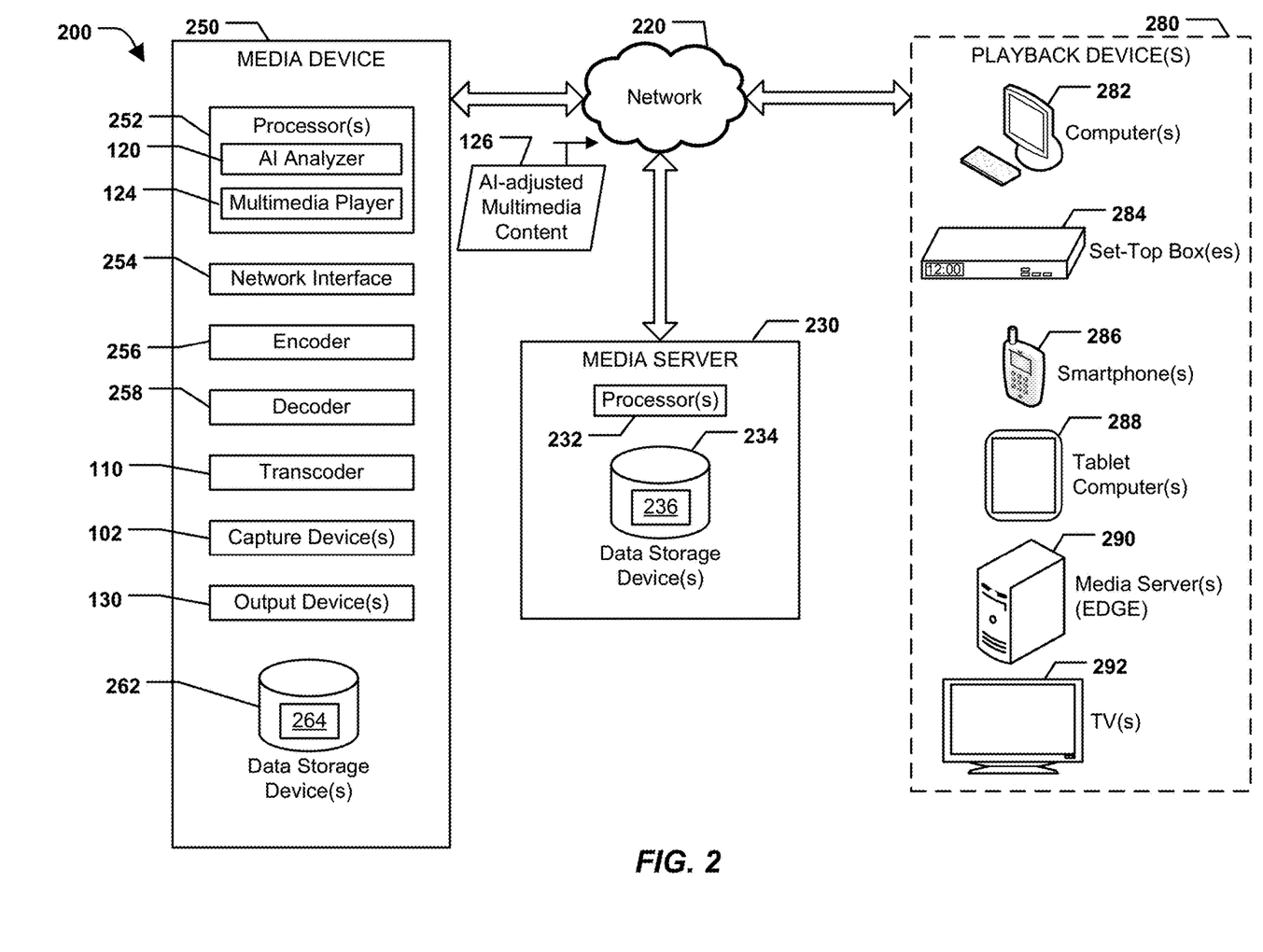
FIG. 2 illustrates another particular implementation of a system to perform AI analysis of multimedia content.

FIG. 2 illustrates a particular implementation of a system 200 to perform artificial intelligence (AI) analysis for multimedia content. The system 200 includes a media server 230, a media device 250, and one or more playback devices 280.

The media device 250 is a computing device, such as a laptop computer, a mobile phone, a smartphone, a tablet computer, a media server, one or more other computing devices, or any combination thereof. In some examples, the media device 250 corresponds to a combination of at least a hardware encoder and video capture device (e.g., camera). In such examples, the hardware encoder receives a media signal from via input interface(s), such as via a high definition multimedia interface (HDMI) or a serial digital interface (SDI), where the media signal corresponds to live media or previously recorded media (e.g., video on demand (VOD) and/or digital video recorder (DVR)) content. In some examples, the media signal includes standard definition (SD), high definition (HD), ultra high definition (UHD), 4K, high dynamic range (HDR), 23.98/24/29.97/30/50/59.94/60 Hz frequency/frame rate, 8-bit color, and/or 10-bit color signals. In another example, the media device 250 receives a media signal (which may include video, audio, or both) from an external device, such as an external camera connected via wire or wirelessly with the media device 250. In yet another example, an external camera is connected to a computing device at a capture site, and the media device 250 receives signals from the computing device at the capture site via a network connection. Thus, it is to be understood that the aspects of the present disclosure can involve more, less, and/or different inter-device and intra-device communication than specifically shown in FIG. 2.

The media device 250 includes one or more processors 252 and instructions that are executable by the one or more processors 252. The processor(s) 252 may include one or more a central processing unit (CPU), a graphical processing unit (GPU), a fixed function encoder, or a digital signal processor (DSP). The media device 250 may include software application(s) that perform media serving or processing, hardware systems (e.g., servers) that support or perform media serving and processing, or any combination thereof. Thus, various operations described with reference to the media device 250, or components thereof, may be implemented using hardware, software (e.g., instructions executable by the one or more processors 252), or any combination thereof. In a particular implementation, one or more operations and/or components described with reference to the media device 250 may correspond to operations and/or components of a cloud-based media server (e.g., a media server available as software as a service (SaaS)).

In the particular example, of FIG. 2, the AI analyzer 120 and the multimedia player 124 are included in the processor(s) 252. For example, the AI analyzer 120 and the multimedia player 124 may include instructions executable by the processor(s) 252. Alternatively, or in addition, the AI analyzer 120 and the multimedia player 124 can include dedicated hardware components, such as circuitry, of the processor(s) 252.

The media device 250 may include one or more network interfaces, such as a representative network interface 254. For example, the one or more network interfaces may include input interface(s) and output interface(s) that are configured to receive data and to send data, respectively. In a particular implementation, the network interface 254 may include a wired interface, a wireless interface, or a combination thereof, that enables the media device 250 to transfer and receive data via a network 220, such as the Internet, a wireless network such as a 3G network, a 4G network, an IEEE 802.11-type network, one or more other networks, or any combination thereof. For example, the network interface 254 may include an Ethernet interface, a wireless interface compatible with an IEEE 802.11 protocol, or other wired or wireless interfaces. Although a single network 220 is shown, it is to be understood that in some cases multiple networks may be used to accomplish inter-device communication (e.g., a combination of local area networks (LANs) and the Internet, a combination of IEEE 802.11 networks and cellular networks, etc.).

The media device 250 may also include one or more encoders, such as a representative encoder 256, and one or more decoders, such as a representative decoder 258, each of which may be implemented using hardware, software (e.g., instructions executable by the one or more processors 252), or a combination thereof. The encoder 256 is configured to encode multimedia content, such as video data, to generate an encoded stream. In some implementations, the multimedia content is generated at the media device 250, such as by capture device(s) 102. In some implementations, the multimedia content is generated by decoding a received encoded stream at the decoder 258. In some implementations, an encoder is present at a capture site, where a camera captures a live stream. The encoder may be included on-board the camera or may be at a capture site computing device. In such implementations, an encoded stream/signal may be received by the media device 250, and the media device 250 may use the decoder 258 to decode the received stream/signal. Alternatively, the received stream/signal may be provided to a transcoder without executing a separate decoding process.

In a particular implementation, the media device 250 generates an encoded stream that is an ABR rendition that may have larger or smaller bit rates, frame sizes, etc. as compared to an original stream. The media device 250 may stream the ABR renditions to destination devices, such as the one or more playback devices 280. In some examples, the ABR renditions include multiple renditions of the AI-adjusted multimedia content 126 based on different bit rates. Alternatively, or in addition, output from the media device 250 (e.g., the AI-adjusted multimedia content 126) may be provided to a publishing destination, such as a content delivery network (CDN) or a social network. In the case of publishing to a social network, output may be communicated via a social application programming interface (API). For example, use of the social API may enable output from the media device 250 (e.g., the AI-adjusted multimedia content 126) to be inserted into a message, post, or newsfeed of a particular social networking account (which may correspond to a business entity or an individual). The media device 250 may also transmit output to the media server 230.

In one example, the media device 250 includes one or more transcoders configured to provide adaptive bit rate streaming in real-time (e.g., on-the-fly) or near-real-time. To illustrate, in FIG. 2, the media device 250 includes the transcoder 110. The encoders, decoders, and/or transcoders of the media device 250 may be configured to perform various stream processing operations, including but not limited to one or more of bit rate conversion, CODEC conversion, frame size conversion, etc. Depending on a format of a received stream, a playback format supported by a requesting player, and/or transcoding parameters in use, a transcoding operation performed by a transcoder may trigger a decoding operation by a decoder and/or a re-encoding operation by an encoder. In a particular aspect, parameters used by a transcoder are stored in one or more transcoding templates or profiles at the media device 250. The media device 250 may thus be configured to process data in accordance with multiple coding technologies and protocols.

For example, the media device 250 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The media device 250 may support audio encoding types including, but not limited to, advanced audio coding (AAC), AAC low complexity (AAC LC), AAC high efficiency (HEAAC), G.711, MPEG Audio Layer 3 (MP3), Speex, Nellymoser Asao, and AC-3. The media device 250 may support communication (e.g., adaptive streaming and nonadaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media device 250 may also support real time messaging protocol (RTMP) (and variants thereof), real-time streaming protocol (RTSP), real-time transport protocol (RTP), MPEG-2 transport stream (MPEG-TS), and WOWZ. Additional audio formats, video formats, coder/decoders (CODECs), and/or protocols may also be supported, and it is to be understood that the techniques of the present disclosure do not require any specific protocol or set of protocols for operation.

Data storage device(s) 262 (e.g., solid-state drive (SSD) devices, magnetic storage, optical storage, etc.) may be used to store instructions 264, data (e.g., streamed events), or a combination thereof. In a particular example, the instructions 264 are executable by the processor(s) 252 to initiate, perform, or control one or more operations described herein, such as one or more operations described with reference to the AI analyzer 120, the multimedia player 124, or both.

The data storage device(s) 262 may also buffer chunks of an ABR rendition and store software programs and/or data used by the media device 250. The data storage device(s) 262 may include one or more computer-readable storage devices, such as random-access memory (RAM) devices, read-only memory (ROM) devices, hard-drive(s), solid state drive(s), one or more other types of storage devices, or any combination thereof.

The media server 230 includes processor(s) 232 and data storage device(s) 234 (e.g., solid-state drive (SSD) devices, magnetic storage, optical storage, etc.). In the example of FIG. 2, the data storage device(s) 234 store instructions 236 executable by the processor(s) 232 to initiate, control, or perform one or more operations described herein. In some implementations, the media server 230 is configured to receive the AI-adjusted multimedia content 126 from the media device 250. The media server 230 may be configured to store the AI-adjusted multimedia content 126 (e.g., at the data storage device(s) 234), to stream the AI-adjusted multimedia content 126 (e.g., to the one or more playback devices 280), or both.

The one or more playback devices 280 are configured to receive media stream(s) from the media device 250. For example, in some implementations, the one or more playback devices 280 are configured to receive the AI-adjusted multimedia content 126 from the media device 250. In FIG. 2, the one or more playback devices 280 include one or more computer systems 282, such as desktop computers, laptop computers, etc. The one or more playback devices 280 may also include one or more televisions (TVs) 292, set-top-boxes 284, smartphones 286, and tablet computers 288. In a particular implementation, the media device 250 is configured to send media streams to one or more media server(s) 290, such as edge servers of a CDN.

During operation at the system 200, the media device 250 may generate the AI-adjusted multimedia content 126, such as described with reference to FIG. 1. In some implementations, the AI-adjusted multimedia content 126 is played at the media device 250, such as using the output device(s) 130. Alternatively, or in addition, the AI-adjusted multimedia content 126 can be provided to the media server 230 (e.g., the via network 220) to be stored at the media server 230, to be streamed to the one or more playback devices 280, or both. Alternatively, or in addition, the media device 250 may send the AI-adjusted multimedia content 126 to the one or more playback devices 280 (e.g., via the network 220).

In some examples, the media device 250 is configured to send the AI-adjusted multimedia content 126 to the media server 230 or to the one or more playback devices 280 using one or more streaming protocols. The one or more streaming protocols can include but are not limited to real-time transport protocol (RTP), real-time transport protocol (RTP) control protocol (RTCP), real-time messaging protocol (RTMP) over transmission control protocol (TCP), or real-time streaming protocol (RTSP).

Although the particular example of FIG. 2 depicts that aspects of the AI analyzer 120 and the multimedia player 124 are implemented at the media device 250, other examples are also within the scope of the disclosure. In one example, operations described with reference to one or more of the AI analyzer 120 and the multimedia player 124 can be implemented at the media server 230. For example, the media device 250 may send the multimedia content 112 of FIG. 1 to the media server 230 to enable the media server 230 to generate the AI-adjusted multimedia content 126. Alternatively, or in addition, operations described with reference to one or more of the AI analyzer 120 and the multimedia player 124 can be implemented at the one or more playback devices 280. For example, the media device 250 may send the multimedia content 112 of FIG. 1 to the one or more playback devices 280 to enable the one or more playback devices 280 to generate the AI-adjusted multimedia content 126. Thus, in examples where the video metadata for a segment indicates that playback of multimedia content should be truncated and the segment should not be shown, the media server 230 or the media device 250 may cause playback to be truncated before the segment is shown at the playback devices 280.

Figure 3:
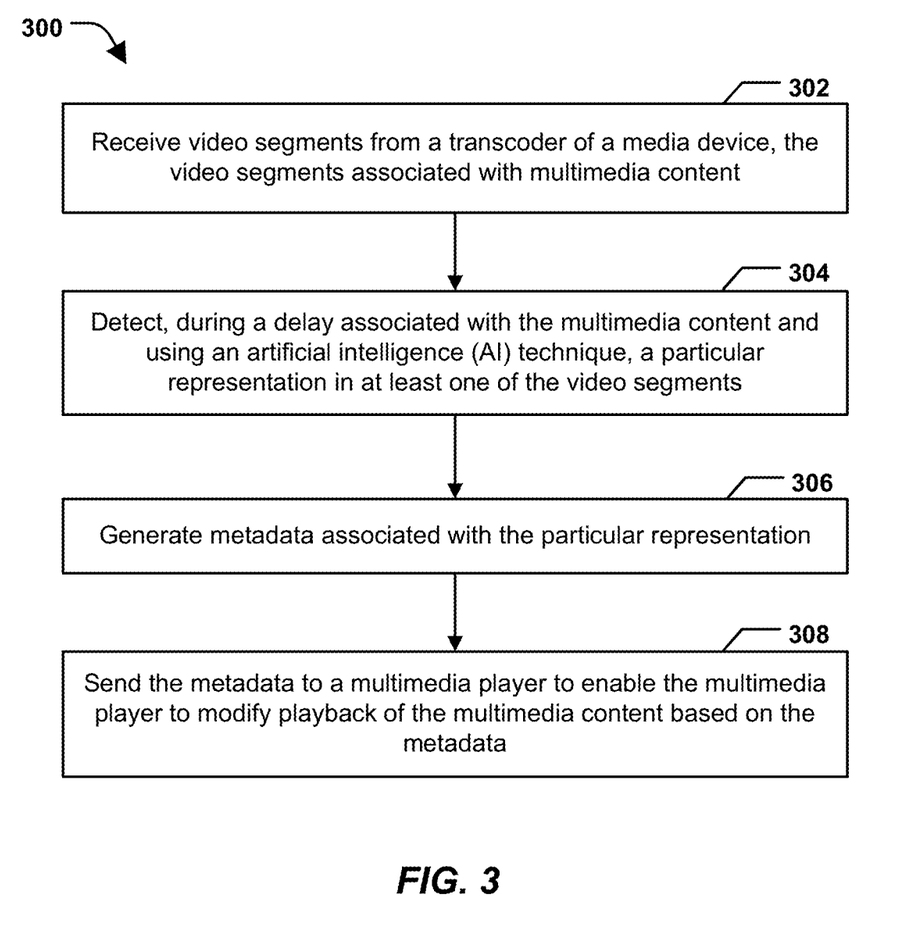
FIG. 3 is a flowchart that illustrates an implementation of a method of AI analysis.

FIG. 3 illustrates a particular implementation of a method 300 of AI analysis for multimedia content. In an illustrative implementation, the method 300 is performed by a media device, such as the media device 250. In another example, the method 300 is performed by the media server 230. In another example, the method 300 is performed by the one or more playback devices 280.

The method 300 includes receiving video segments from a transcoder of a media device, the video segments associated with multimedia content, at 302. For example, the AI analyzer 120 may receive the segments 115 from the transcoder 110.

The method 300 further includes detecting, during a delay associated with the multimedia content and using an AI technique, a particular representation in at least one of the video segments, at 304. For example, the AI analyzer 120 may detect the representation 140 in the segments 115 during the delay 150. In some implementations, the delay 150 is based on a time period associated with transcoding of the multimedia content 112 by the transcoder 110. Alternatively, or in addition, in some examples, the delay 150 is based on a time period associated with transporting the multimedia content 112 from the transcoder 110 to the multimedia player 124. Alternatively, or in addition, in some implementations, the delay 150 is based on a time period of processing the multimedia content 112 by the multimedia player 124. Alternatively, or in addition, in some examples, the delay 150 is based on a time period associated with the AI technique used by the AI analyzer 120 to identify the representation 140.

The method 300 further includes generating metadata associated with the particular representation, at 306. For example, the AI analyzer 120 may be configured to generate the metadata 122 based on the representation 140.

The method 300 further includes sending the metadata to a multimedia player to enable the multimedia player to modify playback of the multimedia content based on the metadata, at 308. For example, the AI analyzer 120 may be configured to send the metadata 122 to the multimedia player 124 to enable the multimedia player 124 to modify playback of the multimedia content 112 by generating and playing back the AI-adjusted multimedia content 126. In some examples, the method 300 optionally includes receiving the request 160 for the metadata 122, where the request 160 is sent in response to a marker of the plurality of markers 118 received from the transcoder 110.

In some implementations, the method 300 optionally further includes modifying the multimedia content 112 by replacing (e.g., covering) the representation 140 with the overlay 128. Alternatively, or in addition, in some implementations, the method 300 optionally further includes terminating playback of the multimedia content 112 based on the metadata 122.

It should be noted that the order of operations illustrated in the flowchart of FIG. 3 and described elsewhere herein are to be considered illustrative, and not limiting. In alternate implementations, the order of operations may be different. Further, one or more operations may be optional and/or replaced by other operations. In addition, one or more operations may be consolidated and in some cases may be performed at least partially concurrently.

It should be noted that although the foregoing implementations are described with reference to a media stream being captured by a media device, in alternate implementations, the described techniques may also be used in conjunction with media data stored at the media device (e.g., a video on demand (VOD) stream). When the media data is stored at the media device 250, the media device 250 may decode the media data via the decoder 258 prior to re-encoding the data via the encoder 256.

In accordance with various implementations of the present disclosure, one or more methods, functions, and modules described herein may be implemented by software programs executable by a computer system. Further, implementations can include distributed processing, component/object distributed processing, and/or parallel processing.

Particular implementations can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, a hardware encoder one or more other computing devices, or any combination thereof. The computer system may be connected, e.g., using a network, to other computer systems or peripheral devices. For example, the computer system or components thereof can include or be included within the media device 250 of FIG. 2.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular implementation, the instructions can be embodied in a computer-readable or a processor-readable device, such as the data storage device(s) 262. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, webcam feeds, birthday parties, school plays, and other streams captured by fixed or mobile devices. It should be noted that a live stream may be delayed with respect to the event being captured (e.g., in accordance with government or industry regulations, such as delay regulations enforced by the Federal Communications Commission (FCC)). A DVR stream corresponds to a time-shifted version of a live stream that is generated by a device that receives the live stream, where the device may still be receiving live stream or may have finished receiving the live stream. Thus, network DVR content may be generated by a device that receives a stream via a network and "records" the received stream, such as for subsequent transmission via a network to another device. The described systems and methods may be used in conjunction with "live linear television (TV)" streams, which may include a live feed, or a VOD asset or a DVR asset being rebroadcast as a live feed. It should also be noted that although certain embodiments may be described herein with reference to video streams, video on demand content, digital video recorder content, etc., not all of the described techniques may require video content/data. Certain embodiments may also be used with content that does not include video (e.g., audio on demand, radio content, music streams, etc.).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method comprising:
   receiving video segments from a transcoder of a media device, the video segments associated with multimedia content, the received video segments correspond to a live stream being delivered to a plurality of playback devices including the multimedia player;
   during a delay associated with the multimedia content, detecting, using an artificial intelligence (AI) technique, a particular representation in at least one of the video segments;
   generating metadata associated with the particular representation, the metadata and the at least one of the video segments include a common identifier to enable synchronization of the metadata with the at least one of the video segments; and
   sending the metadata to a multimedia player to enable the multimedia player to modify playback of the multimedia content based on the metadata, wherein the delay is based on a time period associated with transcoding the multimedia content, a time period associated with transporting the multimedia content from the transcoder to the multimedia player, a time period associated with processing of the multimedia content at the multimedia player and a time period associated with executing the AI technique.

2. The method of claim 1, wherein the particular representation includes an object detected in the multimedia content, a face detected in the multimedia content, or a logo detected in the multimedia content.

3. The method of claim 2, further comprising modifying playback of the multimedia content by replacing the object, the face, or the logo with an overlay.

4. The method of claim 1, wherein the metadata indicates absence of a person in the multimedia content, and further comprising modifying playback of the multimedia content by terminating playback of the multimedia content based on the metadata.

5. An apparatus comprising:
   a memory; and
   a processor coupled to the memory and configured to perform, initiate, or control operations comprising:
      receiving video segments from a transcoder of a media device, the video segments associated with multimedia content, the received video segments correspond to a live stream being delivered to a plurality of playback devices including the multimedia player;
      during a delay associated with the multimedia content, detecting, using an artificial intelligence (AI) technique, a particular representation in at least one of the video segments;
      generating metadata associated with the particular representation, the metadata and the at least one of the video segments include a common identifier to enable synchronization of the metadata with the at least one of the video segments; and
      sending the metadata to a multimedia player to enable the multimedia player to modify playback of the multimedia content based on the metadata, wherein the delay is based on a time period associated with transcoding the multimedia content, a time period associated with transporting the multimedia content from the transcoder to the multimedia player, a time period associated with processing of the multimedia content at the multimedia player and a time period associated with executing the AI technique.

6. The apparatus of claim 5, wherein the operations further comprise receiving a request for the metadata, the request sent in response to a marker received from the transcoder.

7. The apparatus of claim 6, wherein the marker includes a unique identifier (UID) of the at least one video segment, and wherein the request includes one or more of a representational state transfer (REST) request or a websocket request.

8. A non-transitory computer-readable storage device storing instructions that, when executed by a processor, cause the processor to perform operations comprising:
   receiving video segments from a transcoder of a media device, the video segments associated with multimedia content, the received video segments correspond to a live stream being delivered to a plurality of playback devices including the multimedia player;
   during a delay associated with the multimedia content, detecting, using an artificial intelligence (AI) technique, a particular representation in at least one of the video segments, the metadata and the at least one of the video segments include a common identifier to enable synchronization of the metadata with the at least one of the video segments;
   generating metadata associated with the particular representation; and sending the metadata to a multimedia player to enable the multimedia player to modify playback of the multimedia content based on the metadata, wherein the delay is based on a time period associated with transcoding the multimedia content, a time period associated with transporting the multimedia content from the transcoder to the multimedia player, a time period associated with processing of the multimedia content at the multimedia player and a time period associated with executing the AI technique.

9. The non-transitory computer-readable storage device of claim 8, wherein the operations further comprise modifying playback of the multimedia content by replacing the particular representation with an overlay.

10. The non-transitory computer-readable storage device of claim 8, wherein the metadata indicates absence of a person in the multimedia content, and wherein the operations further comprise modifying playback of the multimedia content by terminating playback of the multimedia content based on the metadata.

* * * * *